(12) United States Patent
McIntosh et al.

(10) Patent No.: US 12,205,042 B2
(45) Date of Patent: *Jan. 21, 2025

(54) METHOD AND COMPUTING SYSTEM FOR MODELLING A PRIMATE BRAIN

(71) Applicants: Max-Planck-Gesellschaft Zur Förderung Der Wissenschaften e.V., Munich (DE); Baycrest Centre for Geriatric Care, Toronto (CA); CODEBOX COMPUTERDIENSTE GMBH, Stuttgart (DE); Universite D'Aix Marseille, Marseilles (FR); Centre National De La Recherche Scientifique, Paris (FR); Institut National De La Sante Et De La Recherche Medicale, Paris (FR)

(72) Inventors: Anthony Randal McIntosh, Toronto (CA); Jochen Mersmann, Stuttgart (DE); Viktor Jirsa, Aubagne (FR); Petra Ritter, Berlin (DE)

(73) Assignees: Max-Planck-Gesellschaft Zur Förderung Der Wissenschaften e.V., Munich (DE); Baycrest Centre for Geriatric Care, Ontario (CA); Universite D'Aix Marseille, Marseilles (FR); Centre National De La Recherche Scientifique, Paris (FR); Institut National De La Sante Et De La Recherche Medicale, Paris (FR); Codebox Computerdienste GmbH, Stuttgart (DE)

( * ) Notice: Subject to any disclaimer, the term of this patent is extended or adjusted under 35 U.S.C. 154(b) by 177 days.

This patent is subject to a terminal disclaimer.

(21) Appl. No.: 18/158,182

(22) Filed: Jan. 23, 2023

(65) Prior Publication Data
US 2023/0359906 A1 Nov. 9, 2023

Related U.S. Application Data

(63) Continuation of application No. 16/278,370, filed on Feb. 18, 2019, now Pat. No. 11,562,253, which is a
(Continued)

(51) Int. Cl.
G06N 3/10 (2006.01)
G06N 3/04 (2023.01)
G06N 3/049 (2023.01)

(52) U.S. Cl.
CPC ............... G06N 3/10 (2013.01); G06N 3/04 (2013.01); G06N 3/049 (2013.01)

(58) Field of Classification Search
CPC .......... G06N 3/10; G06N 3/04; G01T 1/2985; A61B 5/055; A61B 5/4088;
(Continued)

(56) References Cited

U.S. PATENT DOCUMENTS 7,349,728 B2    3/2008  Corchs et al.
10,789,526 B2   9/2020  Wilson et al.
(Continued)

FOREIGN PATENT DOCUMENTS

WO    WO-2014020428    2/2014

OTHER PUBLICATIONS

Bezgin et al., "Hundreds of brain maps in one atlas: Registering coordinate-independent primate neuro-anatomical data to a standard brain", NeuroImage, 2012, pp. 67-76.*
(Continued)

*Primary Examiner* — Li Wu Chang
(74) *Attorney, Agent, or Firm* — Schwegman Lundberg & Woessner, P.A.

(57) ABSTRACT

In one aspect the application relates to a computing system for providing data for modelling a human brain comprises a database including a plurality of datasets (or allow access to a plurality of datasets), each dataset including at least a dynamical model of the brain including at least one node and a neurodataset of a neuroimaging modality input. The at least one node include a representation of a local dynamic model and a parameter set of the local dynamic model.

23 Claims, 5 Drawing Sheets

Related U.S. Application Data continuation of application No. 14/419,072, filed as application No. PCT/IB2013/001707 on Aug. 2, 2013, now abandoned.

(60) Provisional application No. 61/678,950, filed on Aug. 2, 2012.

(58) Field of Classification Search
CPC ............ A61B 2576/026; A61B 5/4064; A61B 5/7246; G06T 11/005; G06T 2207/30004; G06T 5/50; Y10S 128/922
See application file for complete search history.

(56) References Cited

U.S. PATENT DOCUMENTS

| | | |
|---|---|---|
| 11,562,253 B2 | 1/2023 | Mcintosh et al. |
| 2002/0061540 A1 | 5/2002 | Grass et al. |
| 2009/0063119 A1 | 3/2009 | Chiang et al. |
| 2011/0270348 A1 | 11/2011 | Goetz |
| 2013/0191153 A1 | 7/2013 | Lee et al. |
| 2015/0127316 A1 | 5/2015 | Avisar |
| 2015/0174418 A1 | 6/2015 | Tyler et al. |
| 2015/0206051 A1 | 7/2015 | McIntosh et al. |
| 2019/0251450 A1 | 8/2019 | Mcintosh et al. |

OTHER PUBLICATIONS

Miocinovic et al., "Stereotactic neurosurgical planning, recording, and visualization for deep brain stimulation in non-human primates", J Neuroscience Methods, 2007, pp. 32-41.*
"U.S. Appl. No. 14/419,072, Response filed Jul. 31, 2017 to Restriction Requirement mailed Jun. 1, 2017", 7 pgs.
"U.S. Appl. No. 14/419,072, Examiner Interview Summary mailed Aug. 16, 2018", 2 pgs.
"U.S. Appl. No. 14/419,072, Final Office Action mailed Oct. 17, 2018", 8 pgs.
"U.S. Appl. No. 14/419,072, Non Final Office Action mailed Mar. 21, 2018", 6 pgs.
"U.S. Appl. No. 14/419,072, Non Final Office Action mailed Aug. 22, 2017", 15 pgs.
"U.S. Appl. No. 14/419,072, Preliminary Amendment filed Feb. 2, 2015", 8 pgs.
"U.S. Appl. No. 14/419,072, Response filed Jan. 22, 2018 to Non-Final Office Action mailed Aug. 22, 2017", 8 pgs.
"U.S. Appl. No. 14/419,072, Response filed Aug. 21, 2018 to Non-Final Office Action mailed Mar. 21, 2018", 10 pgs.
"U.S. Appl. No. 14/419,072, Restriction Requirement mailed Jun. 1, 2017", 5 pgs.
"U.S. Appl. No. 16/278,370, Advisory Action mailed Aug. 16, 2022", 3 pgs.
"U.S. Appl. No. 16/278,370, Examiner Interview Summary mailed Apr. 4, 2022", 2 pgs.
"U.S. Appl. No. 16/278,370, Final Office Action mailed Jun. 7, 2022", 13 pgs.
"U.S. Appl. No. 16/278,370, Non Final Office Action mailed Dec. 7, 2021", 14 pgs.
"U.S. Appl. No. 16/278,370, Notice of Allowability mailed Dec. 21, 2022", 2 pgs.
"U.S. Appl. No. 16/278,370, Notice of Allowance mailed Sep. 20, 2022", 11 pgs.
"U.S. Appl. No. 16/278,370, Preliminary Amendment filed May 6, 2019", 7 pgs.
"U.S. Appl. No. 16/278,370, Response filed Apr. 7, 2022 to Non Final Office Action mailed Dec. 7, 2021", 13 pgs.
"U.S. Appl. No. 16/278,370, Response filed Aug. 5, 2022 to Final Office Action mailed Jun. 7, 2022", 13 pgs.
"U.S. Appl. No. 16/278,370, Response filed Aug. 31, 2022 to Advisory Action mailed Aug. 16, 2022", 15 pgs.
"Canadian Application Serial No. 2,880,758, Office Action dated Oct. 6, 2022", (Oct. 6, 2022), 3 pgs.
"Directionality Data", CoCoMac database; http://cocomac.g-node.org/drupal/?, (Jan. 30, 2015), 4 pgs.
"International Application No. PCT/IB2013/001707, International Preliminary Report on Patentability mailed Feb. 12, 2015", (Feb. 12, 2015), 10 pgs.
"International Application No. PCT/IB2013/001707, International Search Report and Written Opinion mailed Aug. 25, 2014", (Aug. 25, 2014), 13 pgs.
Arbib, M. A., et al., "Synthetic brain imaging: grasping, mirror neurons and imitation", Neural Networks 13 (2000) 975-997, (Jul. 2000), 975-997.
Bezgin, Gleb, et al., "Hundreds of brain maps in one atlas: Registering coordinate-independent primate neuro-anatomical data to a standard brain", Neuroimage, (2012), 67-76.
Collins, et al., "Automatic 3-D Model-Based Neuroanatomical Segmentation", Human Brain Mapping, (1995), 190-208.
Deco, Gustavo, et al., "Emerging concepts for the dynamical organization of resting-state activity in the brain", Nature Reviews Neuroscience 12.1, (2011), pp. 43-56.
Ghosh, Anandamohan, et al., "Noise during rest enables the exploration of the brain's dynamic repertoire", PLoS computational biology 4.10, (2008), 30 pgs.
Honey, Christopher J., et al., "Network structure of cerebral cortex shapes functional connectivity on multiple time scales", Proceedings of the National Academy of Sciences 104.24, (2007), 10240-10245.
Horwitz, B., et al., "Neural modeling and functional brain imaging: an overview", Neural Networks 13 (2000) 829-846, (Jul. 2000), 829-846.
Horwitz, B., et al., "Simulating PET/fMRI studies of visual and auditory pattern recognition using biologically realistic large-scale neural models", Neural Networks, 2001. Proceedings. IJCNN '01. International Joint Conference on (vol. 2), Jul. 15, 2001-Jul. 19, 2001, (Jul. 2001), 878-883.
Jirsa, Viktor, "TheVirtualBrain. Delivering practice results. For revolutionary clinical applications.", www.thevirtualbrain.org/register, (Jan. 30, 2015), 1 pg.
Jirsa, Viktor, et al., "Towards the virtual brain: network modeling of the intact and the damaged brain", Archives italiennes de biologie 148.3, (2010), 189-205.
Ritter, Petra, et al., "The Virtual Brain Integrates Computational Modeling and Multimodal Neuroimaging", Brain Connectivity, vol. 3, No. 2, 2013, (2013), 121-145.
Sandberg, et al., "Whole Brain Emulation", Oxford University Technical Report #2008-3, (2008), 130.
Sanz Leon, Paula, et al., "The Virtual Brain: a simulator of primate brain network dynamics", Frontiers in Neuroinformatics, vol. 7, Article 10, (Jun. 11, 2013), 23 pgs.
Tagamets, et al., "A model of working memory: bridging the gap between electrophysiology and human brain imaging", Neural Networks, (2000), 941-952.
Tagamets, M. A., et al., "Chapter 11 Functional brain imaging and modeling of brain disorders", Progress in Brain Research, vol. 121, 1999, pp. 185-200, (Feb. 29, 2008), 185-200.

(56) References Cited

OTHER PUBLICATIONS

Taylor, et al., "Hard-wired models of working memory and temporal sequence storage and generation", Neural Networks, (2004), 201-224.

* cited by examiner

METHOD AND COMPUTING SYSTEM FOR MODELLING A PRIMATE BRAIN

PRIORITY CLAIM

This application is a continuation of U.S. application Ser. No. 16/278,370, filed Feb. 18, 2019, which is a continuation of U.S. application Ser. No. 14/419,072, filed Feb. 2, 2015, which is a U.S. national stage application filed under 35 U.S.C. § 371 from International Application Serial No. PCT/IB32013/001707, which was filed Aug. 2, 2013, and published as WO 2014/020428 on Feb. 6, 2014, and which claims priority to U.S. provisional application Ser. No. 61/678,950, filed Aug. 2, 2012, the benefit of priority of each of which is hereby claimed herein, and which applications and publication are hereby incorporated herein by reference in their entirety.

FIELD OF THE INVENTION

This invention relates to a method and apparatus for simulating brain function. In particular, this invention relates to a system that simulates brain function by integrating brain models with measured neuroimaging data.

BACKGROUND OF THE INVENTION

Brain function is thought to emerge from the interactions of large numbers of neurons. One aspect of difficulty in the research of brain function is the inability to directly observe brain dynamics. It would be useful to provide an abstract mathematical model of modelled brain dynamics that exhibit a lower complexity than actual brain dynamics. Such a model may be limited to only a few selected aspects of brain dynamics that are of interest. Further model complexity or detail may be added to the model to alter a different range of modelled brain dynamics. Clinical assessment and research may accordingly be conducted on the model to both investigate conditions and test theories.

Besides insights into mechanisms of how brain dynamics emerge, such models allow for the exploration of the consequences of pathological changes in the system, enabling identification of pathological changes and subsequent treatment.

In an aspect, there is a need for a method and apparatus that assists in modelling brain dynamics.

In an aspect, there is a need for a method and apparatus—that enables model-based inference of neurophysiological mechanisms on different brain scales that underlie the generation of macroscopic neuroimaging signals.

SUMMARY

The application discloses a computing system for modelling a human, or more generally a primate brain comprising a dynamical model of the brain, at least one neuroimaging modality input and a decision engine for comparing results of the dynamical model to the at least one neuroimaging modality input. In some examples, the neuroimaging modality input refers to single or multimodal neuroimaging data, i.e. data from one or more different types of neuroimaging data, such as electroencephalography (EEG), magnetoencephalography (MEG), magnetic resonance imaging (MRI) or positron emission tomography (PET). The system or its components may be configured to be implemented as and/or processed by software running on a single computer, a computer cluster or via cloud-computing. Cloud computing is a synonym for distributed computing over a network and includes the ability to run a program on many connected computers at the same time. This includes the provisioning of application services that run client-server software on a remote location. Furthermore, the system or its components may be configured to be implemented as functional modules of a software or modular software, or a computer based database. Throughout this application a computer will be understood to include an entity including a real or virtual central processing unit to receive, compute and output commands from a software or a functional module as described above.

In a further aspect, a computing system for providing data for modelling a human brain comprises a database including a plurality of datasets (or allow access to a plurality of datasets), each dataset including at least a dynamical model of the brain including at least one node and a neurodataset of a neuroimaging modality input. The at least one node include a representation of a local dynamic model and a parameter set of the local dynamic model. Furthermore, each of the datasets includes a set of values for the parameter set of the local dynamic model, which were generated by fitting at least parts of the dynamical model to the neurodataset in a predetermined space. In some examples, the predetermined space may be a space corresponding to the neuroimaging modality input or a source space corresponding to the dynamical model of the brain including the at least one node.

In a further aspect, a computing system for distributing and receiving on human brain modelling includes a back-end system configured for accessing neuroimaging modality input data. The back-end system includes a simulation component with at least a simulation core and a simulation controller. The back-end system may be implemented as a server running on a computer or computer cluster or in a cloud-computing environment. The simulation core is a functional module, such as a software module of the back-end system configured to receive at least a set of parameters from an input, such as a human user input into a computer or an uploaded file including data as input. Furthermore, the simulation core is configured to retrieve neuroimaging modality input from an input, such as an uploaded file including the neuroimaging data or a storage system coupled to the stimulation component. A workflow of the simulation core is controlled by the stimulation controller. In some examples, it is configured to analyse and optionally correct the input, to schedule resources for the stimulation core. In some examples, it is configured to distribute tasks to be performed by the stimulation core to different cluster nodes of a computer cluster or different computers over a network. A storage system may be configured to store data of at least one neurodataset of neuroimaging modality input. One neurodataset is a dataset of neuroimaging modality input data. The different wording is chosen to distinguish it from dataset of the above-mentioned database. Furthermore, the storage system may include a plurality of dynamical models, each dynamical model including a plurality of nodes, anatomical connectivity data, which may be derived from individuals by methods such as diffusion tensor imaging (DTI) or by brain cartography data such as data from the Montreal Neurological Institute (MNI). Furthermore, the storage system may store at least one forward and or inverse transformation model to map the output of the dynamical model to a space corresponding to the neurodataset or to map the neurodataset to a source space corresponding to the plurality of nodes and their output. Additionally, the storage system may provide a decision engine including an entity to fit at least one of the plurality of nodes to the at least one neurodataset.

Further aspects of the computing system will become apparent by the detailed description.

DETAILED DESCRIPTION OF THE INVENTION

This application incorporates by reference Ritter et. al., "The Virtual Brain Integrates Computational Modelling and Multimodal Neuroimaging" in *Brain Connect.* 2013; 3(2): pages 121-45 and Sanz Leon et. al., "*The Virtual Brain: a simulator of primate brain network dynamics*," in Front Neuroinform. 2013 Jun. 11; pages 7:10. Furthermore, this application incorporates by reference the source code of the virtual brain app, obtainable from "http://www.thevirtualbrain.org/register/". The current implementation of the virtual brain app represents a working mode of aspects of the invention implementing some of the features described hereafter.

The problem is to create a standardized simulation framework for a full primate brain model that allows a) comparison of different modelling strategies/model specifications b) simulating brain activity of individual primates.

WHY A COMUPTATIONAL MODEL? Brain function—i.e. cognition and behaviour—are generated by complex neuronal interactions. Brain imaging methods allow us to measure brain dynamics with good spatial and temporal resolution. In order to understand and replicate the underlying generative mechanisms we need a computational model of the interacting neurons.

WHY A FULL BRAIN MODEL? An individual function does not emerge from a localized neuronal population—rather it is the result of orchestrated neuronal activities involving the entire brain. Hence in order to understand and replicate brain function the entire brain web needs to be considered. We need a full brain computational model.

WHY A STANDARDIZED SIMULATION FRAMEWORK? A model reduces complexity. It simulates brain dynamics that exhibit a lower complexity than the actual brain dynamics. Such a model may be limited to only a few selected aspects of brain dynamics that are of interest. Different models are capturing different aspects of brain activity. Further model complexity or detail may be added to a model to alter a different range of modelled brain dynamics. The ultimate goal is to build an increasingly general model that accounts for many aspects of brain dynamics. The creation of a comprehensive model requires an iterative process where models are tested, modified and merged. Such a systematic model creation is only feasible in a standardized framework where the model outcomes and model specifications are well tractable. A standardized framework does not exist for full brain modelling and scientific community struggles with the fact that models are not reproducible and hence can't be utilized in an iterative model generalization process.

WHY INDIVIDUAL VIRTUAL BRAINS? Each brain is different. In order to be able to use the brain model for individual predictions for example in a clinical setting, we need to be able to account for inter-individual differences.

WHY IMAGING RESOLUTION? A full brain model that simulates activity at the same temporal and spatial resolution as brain imaging methods on the one hand can be validated against these signals and on the other hand integrates the information of multimodal data and reveals the underlying—identical and differential—origins. A full brain model that simulates brain activity at imaging resolution is optimal for adding detail to those noninvasively obtained functional brain maps by revealing hidden states and parameters.

Some of the key challenges overcome by the system and methods described within this application are 1) Building the first fully standardized framework that is easily accessible and usable by the research community around the globe. 2) Fitting a full brain model at imaging resolution to empirical functional data of individuals and hence creating individual virtual brains. 3) Creating a database of dynamical regimes that stores all model insights and is accessible for creation of new hypotheses/theories, model refinement and real-life TVB applications.

Figure 1:
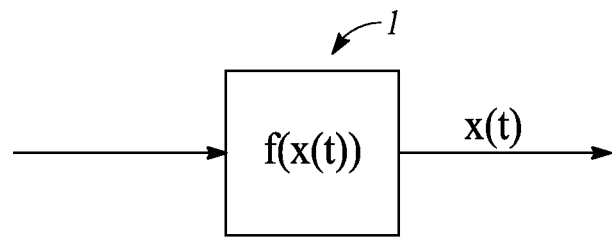
FIG. 1 represents a schematic overview of a node, and a plurality of nodes connected by anatomical connectivity structure information.

Non-invasive neuroimaging modalities like electroencephalography (EEG), magnetoencephalography, functional magnetic resonance imaging (fMRI) and positron emission tomography provide a macroscopic picture of neuronal dynamics, but fall short of identifying mesoscopic or microscopic brain dynamics such as population oscillations or neuronal spike trains. However, macroscopic signal features are thought to emerge from the interaction of neuronal populations, while the explicit mechanism—the neural code—still remains unclear. Instead of attempting to understand neuronal interactions in every detail, it is proposed to reproduce functionally relevant brain dynamics using a large-scale network model that may span one or more salient brain regions. The one or more brain regions may be selected based upon either a particular brain dynamic being evaluated, or a particular brain function being analysed.

The inventors have realized that for providing a computing system for standardized modelling of a primate brain, the computing system may include at least one dynamical model or may provide a choice of a multitude of dynamical models of the brain.

A dynamical model in the sense of this application includes at least a plurality of nodes, wherein at least one, preferably more than one, preferably each node includes a representation of a local dynamic model and a parameter set of the local dynamic model. The dynamic model further includes a connectivity structure based on anatomical principles.

Each node of the dynamical model represents a local subunit of the brain. The number of subunits included in the dynamical model may depend on the spatial resolution of the neuroimaging modality chosen as an input of the computing system. For example, if the chosen neuroimaging modality input is fMRI, then the number of subunits may resemble the number of voxels of the fMRI data. However, if the neuroimaging modality input is EEG, the number of subunits can be chosen to correspond to the number of dipoles, where dipole locations are assumed to be identical to source locations (ROIs) used for DTI-tractography, for example. The number of subunits may also correspond to the number of defined brain regions in which case the data of the neuroimaging modality are getting aggregated for each brain region.

The connectivity structure of the dynamical model is used to connect the plurality of nodes with each other. For example, a first subset of nodes is connected to a second subset of nodes based on the anatomical connections between different nodes, or subunits. This connectivity structure can be chosen from generic data, such as standard brain atlases, for example the NIH Connectome database, or can be based on one individual by taking DTI tractography data from this one individual and connecting the nodes based on this data. Furthermore, the connectivity structure may also include directionality data, such as the data provided by the CoCoMac database (www.cocomac.org) or (http://cocomac.g-node.org/drupal/?).

The nodes include a representation of a local dynamic model, which comprises a parameter set for adapting the local dynamic model. This parameter set governs the local dynamics of the local dynamic model, but may also govern the interactions of a specific node with a connected node. A local dynamic model represents a population of biological neurons, such as a column of the cortex. However, it could also represent a smaller number of biological neurons. Several examples of a local dynamic model include two coupled and modified Hindmarsh-Rose models as presented later on. However, different local dynamic models may also be chosen, such as coupled Wilson-Cowan oscillators, a single oscillator (phase oscillator, Wilson-Cowan oscillator, Fitz Hugh Nagumo oscillator) or others known in the art, such as oscillator models, biophysically founded population models, artificial neuronal networks for example. While in some examples, each node of the dynamic model may be modelled after the some local dynamic model, different examples may include different subset of the plurality of nodes to be based on a first type of local dynamic model, for example the above-mentioned Hindmarsh-Rose models, while other subset of the plurality of nodes are based on different types of dynamic models. For example, the choice of the dynamic model may be based on the physiological behaviour of the population of the brain to be modelled by a node, for example, whether the population generally shows bursting behaviour or high firing rates or low firing rates.

FIG. 1 represents a schematic overview of a node, and a plurality of nodes connected by anatomical connectivity structure information. A representative node 1 can be mathematically represented by a function $f(x(t))=x'(t)$, where $x(t)$ in this example represents a membrane potential and $x(t)$ is also considered to be the output of the node. In a computing system, the node may be represented by a software-implemented module or class which receives as input a choice of a local dynamic model for this node and a parameter set. As will become apparent later, this parameter set is varied and fitted to mimic the behaviour of the data of the neuroimaging modality input.

Figure 2:
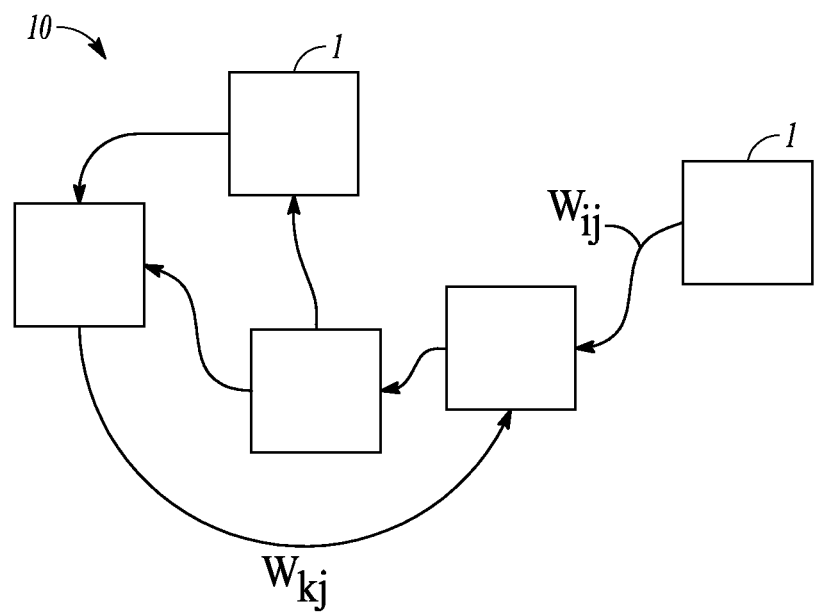
FIG. 2 illustrates a dynamic model comprising a plurality of nodes.

FIG. 2 illustrates a dynamic model 10 built up from a plurality of nodes 1, which are interconnected by connections w_ij. The information, which nodes are to be connected to which other nodes is extracted from connectivity structure information. The connections w_ij have strengths and time delays due to the spatial distance and the conductivity speed in the brain. Furthermore, each node has a geometric position representing its position in a brain. In the dynamic model, each node has an output. It is apparent that each dynamic model may be individualized by choosing the appropriate connectivity structure and by choosing the appropriate number of nodes and by choosing the local dynamic model of each node and the accompanying parameter set. Later on, a dynamic model is explained in further detail.

In further embodiments, the dynamical model can be further individualized or adapted to an individual by fitting the parameter set of one or more, in some embodiments each node of the plurality of nodes, to neurodatasets obtained from an individual brain. These embodiments not only incorporate information of an (anatomical) connectivity structure, but also functional connectivity information from the neuroimaging modality input, i.e. neurodatasets. The integration of the dynamical model with the neurodataset will be explained in more detail below.

In some embodiments, the computing system includes a plurality of dynamic models. This plurality of dynamic models arise from a plurality of local dynamic model for each node and/or from a plurality of different anatomical connectivity structures connecting the plurality of nodes of the dynamic model. Furthermore, the location of the nodes in the dynamical model, the number of nodes which may depend on the neuroimaging modality input used for the computing system as, for example, described above.

A dynamical model may be provided by a class of software representing the computing system. The computing system allows a user to choose the number of nodes, the local dynamical model for each node, and the connectivity structure of the nodes amongst others. Thus, the computing system may be configured to uses different instances or classes of each of the number of node, the local dynamical models for a node and the connectivity structure to construct a user-decided dynamical model.

In some further embodiments, the computing system is further configured to provide a standardized framework of making different user-decided or predetermined dynamical model comparable to each other. In these embodiments, pre-processing steps are performed to ensure a comparability of the different dynamical models.

The creation of a comprehensive dynamical model requires an iterative process where models may be tested, modified and merged. Such a systematic model creation is often feasible only in a standardized framework where the model outcomes and model specifications are well tractable. A standardized framework does not exist for full brain modelling and scientific community struggles with the fact that models are not reproducible and hence can't be utilized in an iterative model generalization process.

Individual full brain models are based on information extracted from different data modalities, i.e. structural information derived from MRI T1-weighted and DTI images are incorporated along with functional data from BOLD-fMRI and EEG. Preparing empirical raw data for implementation in the model involves several pre-processing steps. In order to compare subject-specific models all pre-processing steps are standardized and anatomical locations are identified using atlas based anatomical labelling. Since we are modelling brain signals up to imaging resolution and standard brain atlases are typically region-based (e.g. gyrus-based) their parcellation is too coarsely grained requiring finer subdivisions as well as a precise co-registration of all data modalities is crucial. Apart from anatomical labelling, normalization of structural and functional MRI images to MNI templates is another option for establishing spatial correspondence between brains.

In some embodiments the user can choose between normalization and anatomical labelling to standardize the dynamical models with each other. Thus, in embodiments in which the computing system is configured to store a dynamical model set-up by a user, this dynamical model is stored and labelled to be comparable to other dynamical models stored in the computing system.

The computing system includes a decision engine to compare results of the dynamical model to the at least neuroimaging modality input. The decision engine may be implemented as a software module or a routine to compare the data of the neuroimaging modality to the output of the dynamical model. In many cases, the neuroimaging modality input or neurodatasets are recorded in a space different from the output of the dynamical model. To compare the out put of the dynamical model, the output can be transformed applying a forward transformation model corresponding to the neuroimaging modality input to a space of the neuroimaging modality input. For example, when EEG is the neuroimaging modality input, an EEG forward model may be applied to the output of the dynamical model to represent the output in the space of the EEG, i.e. the output is transformed to represent a simulated EEG signal. This simulated EEG signal can be compared to the experimentally obtained EEG signal. Other forward models exist for different neuroimaging modalities such as the BOLD signal in case of fMRI.

In further embodiments, the neurodatasets may be transformed to a source space of the output of the dynamical model, where in some embodiments each source may be represented by one of the plurality of nodes. An example of such an inverse transforming method is the EEG lead-field inversion method. Further examples of inverse transforming methods are spatiotemporal kernels taken for example from the dictionary of dynamical regimes converting the fMRI BOLD maps in maps of electric activity.

The forward and inverse transform methods may be implemented as software modules or classes. Several standard transform methods have been implemented in the prior art and are referred to below.

In some further embodiments, the decision engine includes a fitting method to fit the parameter set of a node of the plurality of nodes or several of the plurality of nodes to the neurodatasets. Standard mathematical fitting methods are known in the art. In some specific embodiments, the fitting of the dynamical model to the neurodatasets is performed by transforming the neurodataset into the source space of the dynamical model by an inverse transform method. Instead of fitting the parameter sets for all nodes, a subset of the plurality of nodes is replaced by the inversely transformed neurodataset corresponding to the subset. The remaining nodes are then fitted using standard fitting methods. In a further specific embodiment, the output of all but one node is replaced by the inversely transformed neurodataset. The remaining node, i.e. the parameter set of the remaining node is then fitted to the inversely transformed neurodataset corresponding to this node. This greatly reduces the necessary computational power necessary to handle the fitting process. This process can be repeated for every node, wherein each previously fitted node can be either used or replaced by its corresponding inversely transformed neurodataset.

Figure 3:
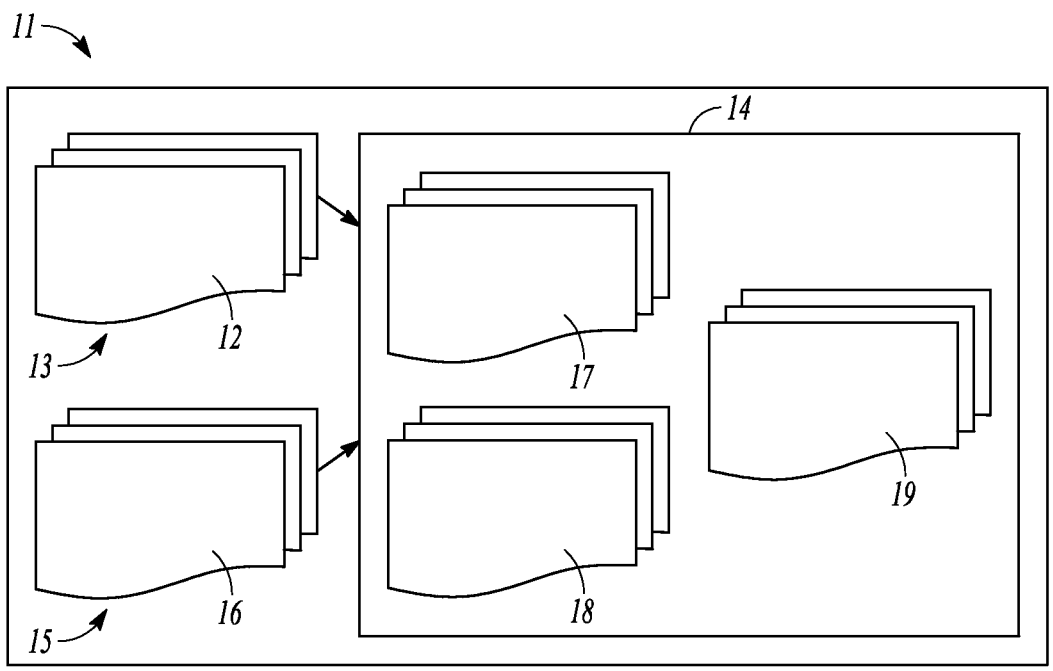
FIG. 3 shows an example of a computing system.

FIG. 3 illustrates a schematic representation of a computing system 11 including a plurality of dynamical models 12 provided by a library 13 of dynamical models. The library may be implemented as a database and a dynamical model may be implemented as a set of coupled differential equations. The dynamical model 12 includes a plurality of nodes as is exemplified in FIG. 2. After a user has chosen a configuration of the dynamical model 12, i.e. its connectivity structure, the initial values of the parameter sets amongst others, the dynamical model can be forwarded to a decision engine 14. In order to standardize the dynamical model and make it comparable to the individualized models of other subjects or patients, spatial transformation rules are implemented that map the individualized model to a standard brain space. An example of how standardization may be implemented is fount in the Virtual brain project, found at http://www.thevirtualbrain.org Additionally, the computing system provides access to neurodatasets 15, which may be added by the user via an upload/download module or can be chosen by the user from a set of neurodatasets provided by the computing system. The plurality of neurodatasets may be pre-processed by the decision engine or may be pre-processed by a further module of the computing system, removing artefacts from the neuroimaging data. The chosen and preprocessed neurodataset 16 is also forwarded to the decision engine.

The decision engine 14 may be implemented as part of a simulation component, which may be part of several computing systems. The decision engine prepares the neurodataset and the dynamical model to be comparable. In our present example, the neurodataset is a simultaneously measured fMRI/EEG dataset, the dynamical model has 96 nodes mapped to different regions as discussed in Ritter et. al.

The decision engine 14 has access to different forward transformation models 17, for example an EEG forward model to project or map the dynamical model output from its source space to the space corresponding to the EEG dataset and a BOLD model to map the output into a space corresponding to the fMRI dataset.

Additionally, the decision engine in this example includes an inverse transformation model 18 to project or transform the neurodataset into a source space represented by the locations of the nodes of the dynamical model. For example, this inverse transform model can be based on the lead-field matrix of the EEG, which is available from several standard toolboxes.

The decision engine may schedule both, the dynamical model and the neurodataset to be copied and transformed into each others space. By doing this operation it can be seen whether the simulated output on different levels, e.g. the output of each node, or the input from other nodes to a specific node, or the output of the dynamical model as a whole or the forwardly transformed output of the dynamical output in the space of the neurodataset resembles the experimental neurodataset on all or some of the different levels.

The decision engine 14 may also include a plurality of fitting methods 19 to fit the simulated output to the experimental output of the neurodatasets on the different levels. Depending on the size of the parameter space to be fitted, all parameters may be fitted simultaneously. However, in many instances the parameter space is too large and a more sensible approach may be helpful. The transforms and the fitting may be performed by the decision engine itself, or may be forwarded by the decision engine to a processing unit, such as a real or virtual central processing unit.

One example of a fitting method provided by the decision engine is fitting each node sequentially and independently of each other. In further examples, several nodes may be fitted simultaneously of the remaining nodes of the dynamical model. In the present example, in which each node is fitted sequentially, i.e. one node after the other, the fitting method tunes this node that receives local and global inputs from all connected nodes. However, the activity of all connected nodes is represented by the empirical data transformed into source space. Hence the activities of all the connected nodes need not to get fitted while tuning the single node or group of nodes of interest. Subsequently the next node is tuned following the same principle. This is repeated until each of the nodes of interest has been estimated. With this approach the fitting method fundamentally downsizes the number of parameter combinations to be tested. This fitting approach allows disentangling three constituents of local brain activity: 1) local intrinsic activity, 2) local network inputs and 3) global network inputs. This allows for systematically exploring how the computations of local populations operate under the influence of global context such as resting state activity.

By successively tuning each node, a set of values for each parameter set is fitted which resembles the experimentally measured activity in the neurodataset.

In further examples the parameter set may be fitted for succeeding epochs or time snippets of the neurodataset to reflect different output patterns of the dynamical model due to different experimentally recorded signals. The set of values for the parameter set may then be derived for different epochs. The set of values for the parameter set thereby can be considered to be time-dependent. In case it is known that certain parameters of a node are more likely to stay invariable over several epochs (i.e. the range of a minute, or half an hour or more for example) it can also be considered to fix this parameter and only allow a variation of parameters known to change even on shorter time-scales such as seconds To further simplify the fitting process or to account for temporal trajectories of the dynamical model, the neurodataset may be separated into neurodatasets containing a smaller time window than the full neurodataset. For example, the fitting can be performed on small time snippets or epochs of the neurodataset containing only seconds (0.1 seconds to 10, 20, 40 or more seconds) of the original dataset. In other embodiments, the time length of the entire neurodataset may be used.

The time course of the neurodataset encodes a functional connectivity of the dynamical model, which is different from the connectivity structure mentioned before. As an analogy, the connectivity structure or structural connectivity provides the pathways of how different nodes of the dynamical model are connected with each other similar a road network. The functional connectivity encoded in the neurodataset resembles the traffic over time in this "road" (or in this case node) network. Thus, the parameter sets of different nodes may be fitted to represent the (neural information) traffic through the network.

According to another aspect, the computing system is configured for providing data modelling a primate or human brain comprising a database including a plurality of datasets. An example of the database is a dictionary of dynamical regimes, a specific example of which is explained below.

It is noted that the computing system, in some examples, need not necessarily contain one of the plurality of datasets, but that the database is configured to store, retrieve or modify datasets as described in the following paragraph. A database may be implemented as software or a server environment and may include interfaces and/or routines for retrieving, modifying, downloading and/or uploading datasets from the database. The database may be a SQL variant or other well-known software architectures.

Each dataset of the database includes a container for a dynamical model of the brain. The dynamical model, as has been discussed above, may include information of the number of nodes, the local dynamic model type chosen for each node, and a set of values for the parameter set of a local dynamic model of at least one node, in further examples all nodes of the model. Furthermore the container may contain a structure to save the connectivity structure of the dynamic model, for example the tractography for a node of interest with the respective fibre tract length. Additionally, the dataset may contain the output of the dynamic model based on the set of values of the parameter set of the nodes of the models.

The neuroimaging dataset, i.e. neurodataset is also part of the dataset of the database. In some examples, the neurodataset has been pre-processed and freed of artefacts, such as heartbeat or eye-movement based activity in an EEG. The neurodataset may be stored as a matrix, wherein the rows (or columns, respectively) represent the different recording channels and the columns (or rows, respectively) represent time. For example, in a 64-channel EEG recording, the matrix may have 64 rows, one for each channel of the EEG and 10000 columns for a length of 100 s at a resolution of 10 ms. When the neurodataset includes or consists of an fMRI recording the matrix may have a number of rows (or columns, respectively) corresponding to the number of voxels of the fMRI and a number of columns (or rows, respectively) for each time step. Including neurodatasets from different neuroimaging methods results in a corresponding number of transform matrices. The neurodataset may further include an inversely transformed matrix, for example, a convolution of the lead-field matrix of EEG and the corresponding EEG matrix to show the source activities for all dipoles of the inverse EEG model times the time steps, i.e. a representation of the EEG in source space. The neurodataset may also comprise signal analysis results of aforementioned imaging data such as functional connectivity matrices (that are matrices describing the degree of similarity/mutual information of the temporal behaviour of pairs of nodes) or graph theoretical measures that equally may serve as reference for parameter tuning.

The set of values of the parameter set is derived by fitting the dynamic model to an instance of the neurodataset, for example, a time window of the duration of 100 seconds as an epoch to the representation of an EEG in source space.

In other examples, the set of values may be derived by using a forward model and fitting the set of values for the parameter set so that the forwardly transformed simulated activity of the dynamic model in a space corresponding to the neuroimaging modality input reflects the actual neurodataset data in this space.

The set of values may also be stored in a matrix type structure, wherein each entry of the matrix is a vector containing the fitted or prior set of values and index of the matrix entry indicates the position of the node. Additionally, the matrix entry may also include the position of the node with respect to source space of the neurodataset.

In further example, a dataset may include additional information, such as information about the methods applied during the pre-processing of the data, the length of the neurodataset, in case the neurodataset is separated in shorter neurodatasets a labelling of the different neurodatasets according to their occurrence, the condition of the subject from which the neurodataset was obtained, i.e. a healthy or sick subject, which disease, the age of the subject and other types of meta information such as the experimental/recording condition, e.g. as resting state or a specific task.

The computing system may include a search entity configured to receive input from a user via an interface (for example a web interface) indicating a property of a neurodataset as a search request. For example, the property may be to look for a dataset including EEG data including an alpha-rhythm or another prototypical rhythm known to occur in an EEG. The search entity processes the search request and analyses the datasets. If some of the datasets include the desired property these datasets are marked and displayed for the user, including the particular time frame during which the particular property occurred. The user may then choose to inspect the datasets manually to see whether one of the datasets is helpful to the user. For example, the fitting of the parameter sets of the dynamic model of this user may be performed faster of the prior values for the parameter set are chosen to resemble the particular searched property, which is also found in the neurodataset of the user. In other words, in some examples, the database may help the user to find suitable prior values for a parameter set. In further embodiments, the search request may also include the used or preferred local dynamic model used by the user to exclude datasets using other local dynamic models. The search request may further include additional information to reduce the number of dataset which are suitable for the user.

The search entity, thus, may scan the datasets and forward datasets including suitable dynamical or local dynamic models to a signal-processing unit, which in return analyzes the neurodataset of the dataset for a property indicated by the search request.

In other examples, a computing system may automatically search a database for suitable sets of values for parameter sets before fitting a yet unfitted dynamical model to a current neurodataset. In these examples, the computing system may analyze the current neurodataset to be used for the fitting of the yet unfitted dynamical model and search the database for datasets including neurodatasets showing similar behaviour than the current neurodataset. If the datasets also include comparable dynamical models, the set of values of the dynamical model may be used as a prior for the fitting of the yet unfitted dynamical model.

In the previous examples, the search entity initiated a search of the neurodataset, in particular the part of the neurodataset in the space of the neuroimaging modality. However, in further examples, the search entity may also initiate a search of the neurodatasets in a source space. If, for example, the neurodataset includes information dipole source activity derived from an EEG, this data may also be searched for properties. The search entity may not only provide a mask to enter the properties to be searched, but also be functionally connected to a signal-processing unit to analyze the data contained in each dataset to search for the property.

In addition or alternatively to searching and analyzing the neurodatasets, the search entity may also search or forward the data corresponding to the dynamical models. For example, if a user is interested in dynamical models that exhibit a certain type of global behaviour (for example an alpha rhythm), while the corresponding nodes exhibit bursting behaviour the search entity may forward the dataset to the signal-processing unit and receive and analyze a result from the signal-processing unit whether a dataset has the desired properties. In this sense the search entity can perform searches of behaviour on the node level, the dynamical model level, or a property of a pattern of incoming input into a node (which reflects the output of nodes connected to said node). Many other properties can be envisioned to be searched by the search entity.

In some examples the database may also be configured to extend a dataset. For example, if a certain dataset is found in connection with a particular property by man different search requests, this property may be added to the dataset. Over time this adding of properties may also result in a ranking of dataset with respect to specific properties. By performing a ranking based on number of the dataset being found, datasets can identified to show prototypical behaviour. Further rankings can be performed by the database, for example, by noting whether a set of values for a parameter set of a node when used as a prior for other datasets to be analysed results in a faster convergence of the fitting.

The database may be configured to add further datasets outputted by computing system as discussed in this application which include a dynamical model of the brain, a neuroimaging modality input and a decision engine to compare and or fit the results of the dynamical model and the neuroimaging modality input.

The database may also be used to infer knowledge. Based on simulations of empirically fitted full-brain models we perform state-space explorations. Identified state-space motifs are associated with physiological or pathological behaviour and stored in the dictionary. A state space is spanned for example by the state variables of local population models, global input and local input. We investigate possible flows on manifolds that are associated with resting state networks of functional networks in general. Such a manifold is a definable subspace. A flow lies on such a manifold as a laminar vector field. In other words we now identify generalizable geometric objects in the state space on which the entire neural behaviour takes place. Different objects characterize different functional network/resting state network (RSM) states/properties. Initially we calculate the state space trajectory and identify clearly dissolvable sub spaces with laminar flows. In other words we identify state-space motifs that are associated with RSN activity. For example, consider a node in the visual cortex. At this site the BOLD signal time course is almost identical to the time course of the visual RSN. Or put it differently the visual RSN determines strongly the activity of that node. With TVB we are able to simulate the electric and fMRI activity for this node—i.e. visual RSN activity. We now are able to see how global, local input and local computation behave at times of high or low activity of the visual RSN or at transition points.

Figure 4:
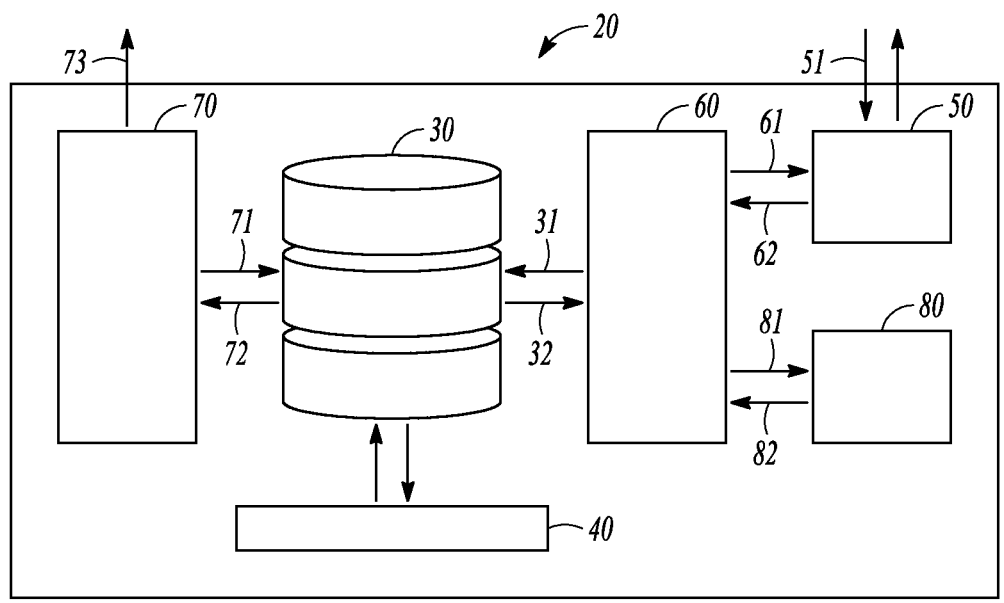
FIG. 4 discloses an example of a computing system including a database.

FIG. 4 discloses a schematic overview of an example of a computing system including a database as described above and includes some workflow aspects handled by the system. Computing system 20 includes a database 30, which either stores itself or accesses a data storage system 40 storing datasets as described in one of the previous examples. The computing system 20 includes a web interface 50 by which a user may access the database 30 through a search entity 60. In other examples, the web interface 50 may also allow direct access to the database 30. Furthermore, the computing system includes an upload/download module 70 allowing other components to upload or download data from the database 30. The other components may include a human user or a component of the computing system such as a server or another computing system.

The search entity 60 may be a search engine, configured to process search requests input into a web interface. Other interfaces may also be possible, for example by parsing files for search terms. Other interfaces my provide access for or to a computing system to fit parameter sets of nodes of a dynamical model to neurodatasets.

In the present example, a user enters input 51 into the web interface. The input 51 is formatted and forwarded as a search request 61 to the search engine 60. The search request 61 includes properties of neurodatasets which the user seeks. As an output the user requests a set of values for a parameter set of a specific node in his or her dynamical model of a brain. The node is represented by a local dynamic system of an excitatory population represented by a Hindmarsh Rose mean-field model coupled with an inhibitory sparsely firing integrate-and-fire model and is connected to other nodes. The connectivity structure suggests that the node is located in a region of the visual cortex The search entity starts a query 31 with the database and searches the database 30 for datasets which include a node with a similar local dynamical model. The database 30 returns several neurodatasets 32 of datasets including such a node. The search entity 60 forwards each neurodataset 32 with a command 81 to a signal-processing unit 80. The signal-processing unit may be a software module or a toolbox which can be included in a search entity. The command 81 indicates to the signal-processing unit 80 which property is desired in the neurodataset and analyzes the different neurodatasets. Upon success, a message 82 is returned to the search entity indicating the neurodatasets which fulfil the different desired properties. The search entity then may request from the database to allow the download module 70 to access the database (71) and download the parameter set 72 of the specific node desired by the user. The download module 70 then outputs a file 73 to the user. In the meantime the search entity 60 has forwarded a result 62 of the search request 61 to the web interface, which outputs that the search has found a number of hits and file 73 may be accessed.

Figure 5:
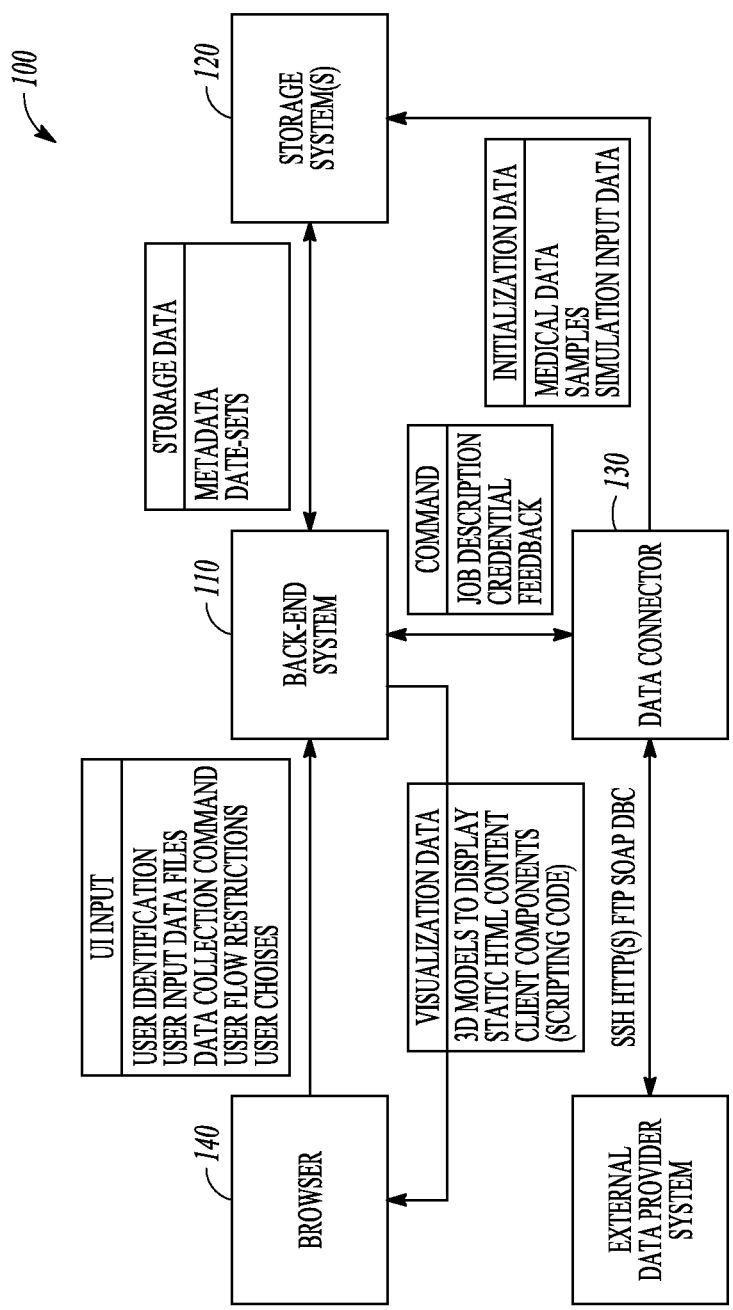
FIG. 5 illustrates an architecture of a computing system.

FIG. 5 illustrates a computing system 100 including a back-end system 110, a storage system 120, a data connector 130 and a web interface which is accessible by a web browser 140. The computing system 100 may run on a standalone computer, but may also be distributed over several computers. For example, the web browser 140 may be located in a location of the user, while the other components are implemented in a cloud for cloud computing. A system which is distributed over computers, may be configured with a minimum set of installed components on the client side, and uses the cluster infrastructure for all operations, including data storage.

In the present example, a set of multiple interaction interfaces is provided, to accommodate support for different user typologies and deployment alternatives. For example, some users may access the web interface with a graphical user interface, while other users may interact with a scripting interface, uploading more detailed scripts.

A system which is distributed over computers, may be configured with a minimum set of installed components on the client side, and uses the cluster infrastructure for all operations, including data storage.

The back-end system 110 may summarize the logic and applications, which enable datasets to be fed into the system, to be processed according to a configurable parameter-set as described above and to be visualized.

In this example, the back-end system 110 handles the different interfaces, such as for example the shown web interface. Regardless of the chosen interface for accessing the back-end system 110, the back-end system handles and distributes data in a unified manner.

The back-end system 110 has dynamic components packed, dependent on the chosen interface and deployment procedure. An automatic packaging tool will make sure the correct components are packed. For example, with the web interface.

The storage system 120 is configured to process meta-data, which should be searchable and, in some examples, on big datasets (which are also structured, but do not benefit from decomposing and feeding into a standard database).

The meta-data may be kept in database, for example a relational database, or an XML-file or another suitable searchable file.

Furthermore, the storage system 120 may be configured to store meta-data regarding one or more of the following: at least one neurodataset of neuroimaging modality input data, a plurality of dynamical models, each dynamical model including a plurality of nodes, connectivity structure data, a plurality of local dynamic models representing a node, at least one forward transformation model for mapping an activity of the plurality of nodes into a space corresponding to the neuroimaging modality input, at least one inverse transformation model for mapping the imaging modality input into a source space corresponding to the plurality of nodes and a decision engine including at least one entity for fitting at least one node of the plurality of nodes to the at least one neurodataset. The data itself may be stored elsewhere, for example in a data warehouse component of the computing system attaches to the storage system. However, the storage system may also store the above mentioned data structures by itself.

The data connector 130 is configured to allow access to external data provider system. Big datasets of medical information already exist in multiple external data storages (used for other purposes, too). The data connector may be configured to serve as an interface for accessing external data storage systems, such that data from this external system can be imported. The data connector 130 may also be configured to forward data toward some External Data Storages. Thus, the Output Data requires to be processed and exported from an internal form into an accepted external format. Some possible access protocols, such as ssh, http(s), ftp, soac or dbc are listed in FIG. 4. A Data-Connect command can be initiated by the Browser interface or the Console Interface, be passed to the back-end system, and then be forwarded to the data connector. The Data Connector may be configured to receive a Job Descriptor, which includes information about the External Data Source, credentials to access the system and operation target (i.e. what to do with the data). The meaning of the data to be imported/exported can come from the External Data Source itself, in an accepted format (metadata), or from the Back-End System.

An alternative to the data connector is to have all the input data "uploaded" from the user interface. While this approach simplifies the architecture of the computing system, the size such data can have, and the frequency of the operation often allows a data connector to improve the overall performance of the system. Nevertheless an upload from the browser interface can be established in addition to the data connector.

Figure 6:
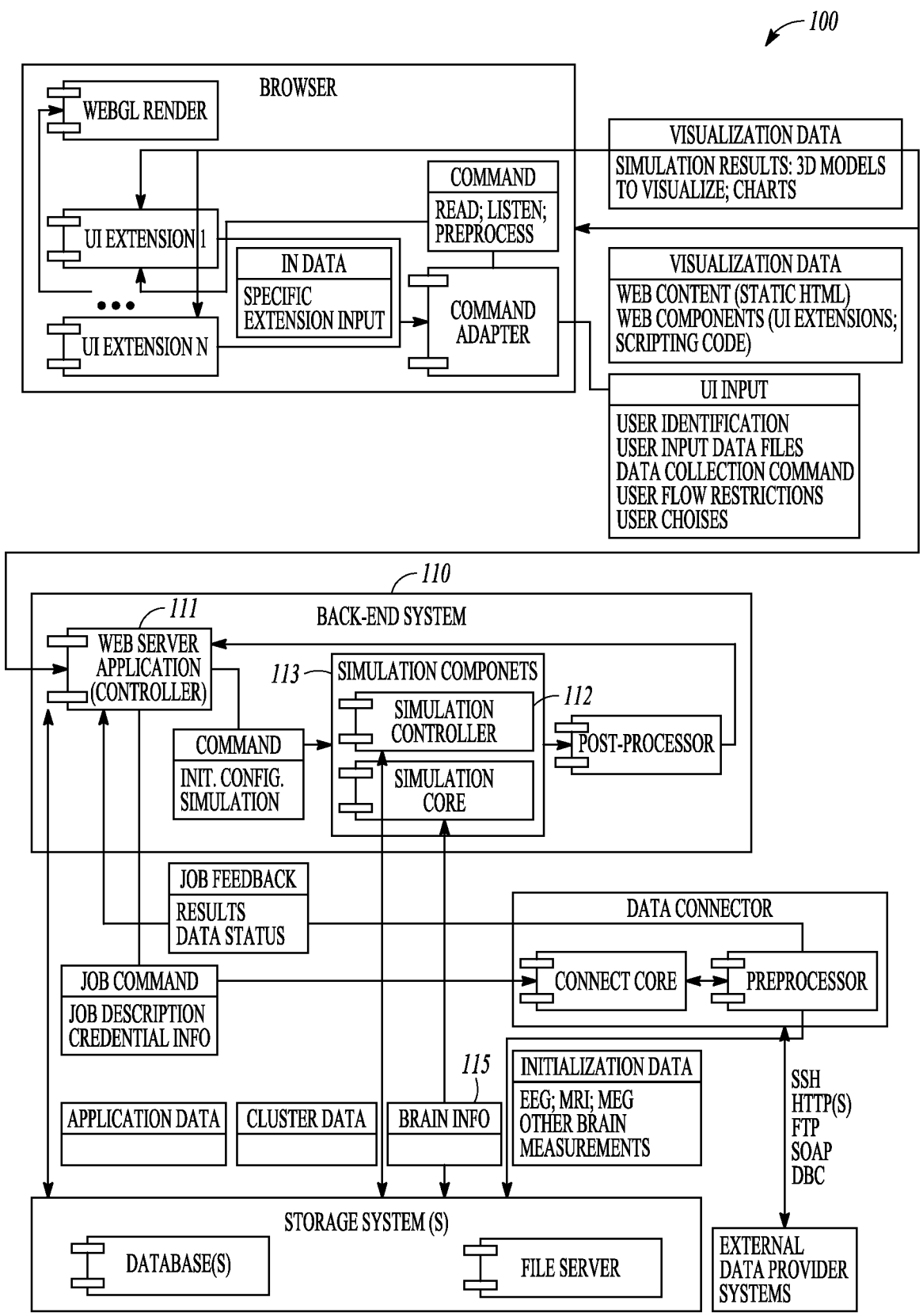
FIG. 6 illustrates some optional refinements of the computing system of FIG. 5.

In FIG. 6 further details of the computing system of FIG. 5 are illustrated.

The web server application 111 of the back-end system controls an HTML Interface and receives data from it. For example it can be used to serve as the point to input properties to be forwarded to the storage system 120, which searches a dictionary of dynamical regimes like database (for a description please see above).

Also at this application 111, visualization parameters and input data will be prepared, for usage at the HTML Interface level, and for passing it to the back-end components, respectively.

The back-end system includes a simulation controller 112 for controlling the workflow between different Application Interfaces and the actual business logic in the Back-End.

Thus this component needs to be abstract and may not have a connection with the interaction method (script, html or standalone interface).

The Simulation Component 113 is responsible for all the scientific computation related to brain models and data. The Simulation Component may receive controlling messages from the simulation controller and will know how to retrieve required Brain-Input data from the Storage System, i.e. the desired local dynamic models, the connectivity structure data, the resulting dynamical model of the brain, the number of nodes etc. based on that input. Furthermore, it may be used to integrate neurodatasets into the analysis. The simulation component may also include or may be functionally connected to the decision engine or compare and/or fit a dynamical model to a neurodataset. This Brain Input data and its information flow between the storage system 120 and the stimulation component is illustrated by data 115.

A post-processor 114 operates on simulation results, takes a configurable set of parameters to adjust the applied algorithms (applied by the simulation core) and may return results wither to the simulation component or the web server. Additionally, it might include a visualization component to help illustrate results in a more easy to understand fashion. The visualization algorithms may include one or more of the following: cortical surface data visualization, volume based data (fMRI, lesion site), visualization as a movie of selected sources with the brain as a background, visualization of connectivity matrices (structural and functional connectivity), visualization for the Connectome proposed data formats (NIFTI, GIFTI, GraphML, TrackVis), display of multiple time series with possibility to let it shift through (as known from EEG) for arbitrary sources, nodes, electrodes, display of wave let time series with possibility to let it shift through (as known from EEG) for arbitrary sources, nodes, electrodes, power spectrum for time series of arbitrary sources, nodes, electrodes, frequency-time plot of arbitrary sources, nodes, electrodes, coherence matrix of arbitrary sources, nodes, electrodes.

Sub-components for the Storage system are Database(s) and File System(s). One of these two elements could be used exclusively, but a complementary solution is considered better. Different distributions (Cluster or Stand-Alone) might have differences in the way data is stored.

Figure 7:
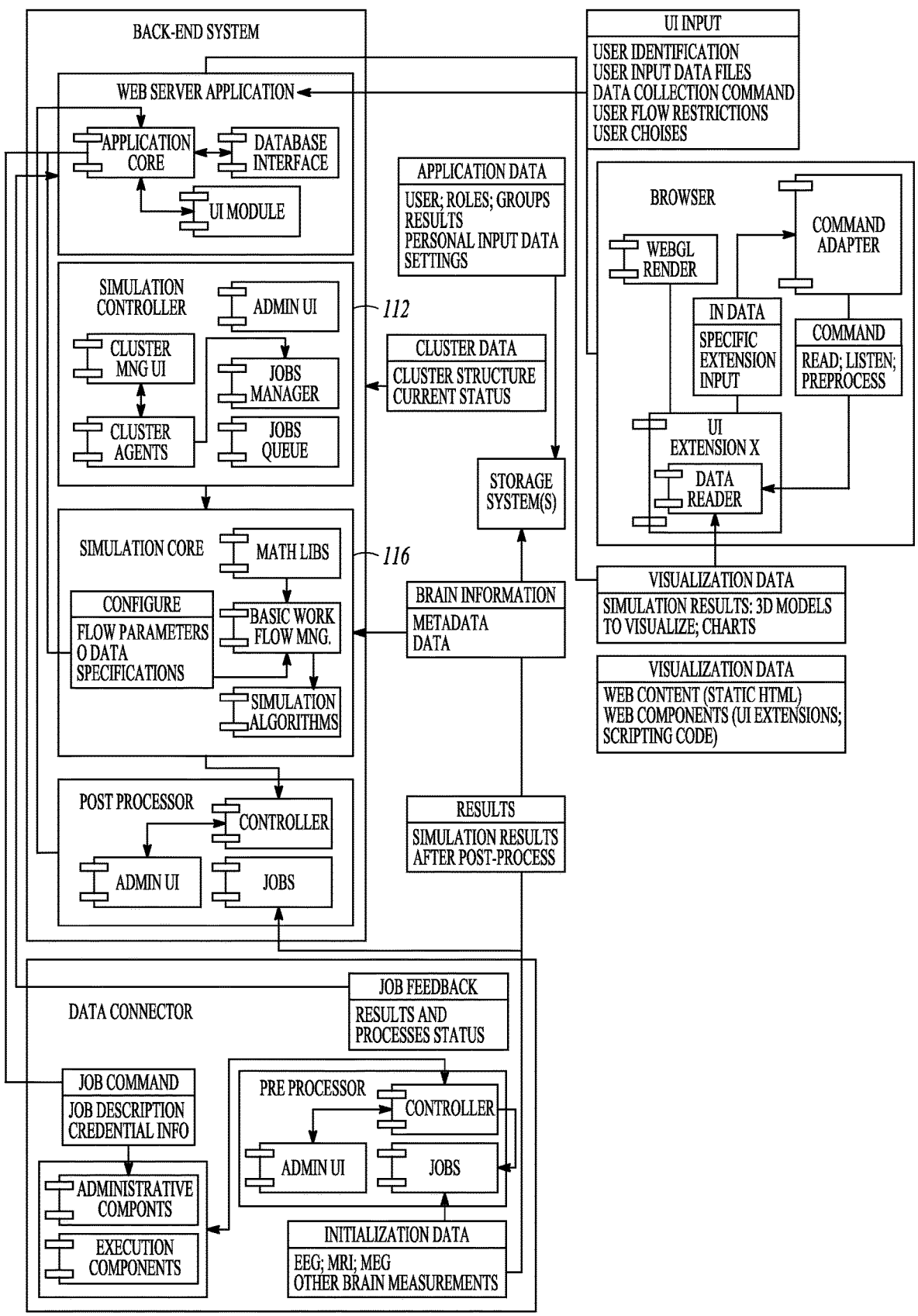
FIG. 7 shows additional optional features of the computing system of FIGS. 5 and 6.

In FIG. 7 several additional optional refinements of components of the computing system are illustrated. In particular, it is illustrated that the simulation core 116 handles the simulation algorithms, such as the differential equation solvers, the transform models, the access to mathematical libraries to perform pre-processing of data, and the fitting of parameter sets of the nodes of the dynamical model, for example.

Furthermore, it is illustrated how the brain information including metadata and data such as the number of nodes, the local dynamical model chosen for a node, the anatomically founded connectivity structure of the nodes to arrive at a global model and other data such as the simulation results, i.e. the set of fitted values of the parameter sets and the neurodataset used to fit the parameter sets are stored in the storage system as a dataset which may be accessed by the web browser to find statistical prior information for future simulations, i.e. which may form a dataset of a database of dynamical regimes or a dictionary of dynamical regimes.

In the following, several aspects of the computing system, particularly relevant to the derivation of the dynamical model, pre-processing of neurodatasets the comparison of the output of the dynamical model and the integration of the dynamical model and the neurodatasets to arrive at a fitted set of values for a parameter set of one or more of the plurality of nodes are described. These aspects are only optional aspects.

In an aspect, a dynamical mathematical model that is able to capture relevant features of brain activity at the mesoscopic scale, i.e., the scale of cortical columns, nuclei and populations comprising up to several hundreds of neurons, may be provided for modelling the one or more brain regions. In an aspect, at least some of the one or more brain regions may be modelled by a region-specific dynamical mathematical model.

This approach accounts for two fundamental principles of brain organization: segregation and integration. In both the brain and existing computational brain models, these principles are realized by a small-world architecture in which signals from functionally specialized and densely connected local groups are integrated by long-range connectivity Multi-modal neuroimaging captures different aspects of brain dynamics that can be related to cognitive states.

Providing a system that integrates modelled brain dynamics with input of one or more neuroimaging modalities provides a tool to enable the research and assessment biophysically relevant parameter changes as they occur in changing brain states or as a result of pathology. Accordingly, the tool may be used for clinical assessment to identify and counteract unfavourable processes in the brain and to promote beneficial processes. The tool may further be used in research to identify (i) fundamental neuronal mechanisms that give rise to typical features of brain dynamics and (ii) how inter-subject variability in brain structure results in differential brain dynamics.

In an aspect, a computational model may be provided that integrates multimodal neuroimaging data together with existing knowledge about brain functioning and physiology. In an aspect, the computational model may model basic bottom-up interaction between elementary brain processing units, to describe high-level brain function. Instead of modelling the interaction between abstract entities or concepts, the building blocks of the model are neurons, respectively neural populations. The use of model building blocks that correspond to real neurophysiological entities are useful for modelling the generation of simulated signals that show similar dynamics to actual neuroimaging signals.

Large-scale neural network models can be built in a way that enables the incorporation of all prior knowledge about brain physiology and processing that is necessary at the desired level of abstraction. These models can be combined with forward models that allow the simulation of neuroimaging modalities. This approach promotes the direct formulation of hypotheses on how cognitive processes are generated by neuronal interaction. Those hypotheses can take the form of specific features of the model network structure, i.e. connectivity strength and distance between neural elements, or biophysical properties like resting potentials, membrane permeability, plasticity effects, etc. The data generated by these models can be directly compared to signals from the respective imaging modality.

Comparing different imaging signal modalities to a single underlying model of neural generators can be exploited in several ways: the exploration of model weaknesses that lead to residuals between data and model output can be traced either to shortcomings in the model network structure or to suboptimal parameter settings. The iterative refinement of model network structure and optimization of parameter values leads to systematic improvements in model validity and thereby in knowledge about brain physiology and cognitive processing.

Models that have been proven to accurately reproduce resting state data can be fitted with data from different experimental conditions. Cognitive and behavioural experiments can then be interpreted in the light of model behaviour that directly points to the underlying neuronal processes. For example, analysing the variation of parameter settings in response to experimental conditions can deliver further insights on the role of the associated structural or dynamical aspect in a certain cognitive function. Furthermore, the relevance of neurobiological features for the emergence of self-organized criticality and neuronal information processing can be inferred.

In summary, the model-based nexus of experimental and theoretical evidence allows the systematic inference of determinants of the generation of neuronal dynamics. In the following, we first describe the modelling environment and the data and then outline two complementary approaches for the model based integration of subject specific physiological priors and recorded neuroimaging data from different modalities. We conclude with some statements concerning feasibility and possible subsequent analyses upon successful integration of model and data.

Large-Scale Brain Models with Local Mesoscopic Dynamics

The brain contains about $10^{11}$ neurons linked by $10^{15}$ connections, with each neuron having inputs in the order of $10^5$. The complex and highly-nonlinear neuronal interaction patterns are only poorly understood and the number of degrees of freedom of a microscopic model attempting to describe every neuron, every connection and every interaction is astronomically large and therefore too high to directly fit with recorded macroscopic data. The gap between the microscopic sources of scalp potentials at cell membranes and the recorded macroscopic potentials can be bridged by an intermediate mesoscopic description. Mesoscopic dynamics describe the activity of populations of neurons organized as cortical columns or subcortical nuclei. Several features of mesoscopic and macroscopic electric behaviour, e.g., dynamic patterns like synchrony of oscillations or evoked potentials, show good correspondence to certain cognitive functions, e.g., resting-state activity, sleep patterns or event related activity.

Common assumptions in mean-field modelling are that explicit structural features or temporal details of neuronal networks (e.g. spiking dynamics of single neurons) are irrelevant for the analysis of complex mesoscopic dynamics and the emergent collective behaviour is only weakly sensitive to the details of individual neuron behaviour. Another common assumption is that neurons in a population that constitutes a functional cluster exhibit similar behaviour. This accounts for the relatively new concept from statistical physics that macroscopic physical systems obey laws that are independent of the details of the microscopic constituents from which they are built. Thus, our main interest lies in deriving the mesoscopic laws that drive the observed dynamical processes at the macroscopic scale in a systematic manner.

Non-invasive neuroimaging signals constitute the superimposed representations of the activity of many sources leading to high ambiguity in the mapping between internal states and observable signals, i.e., the pairing between internal states of the neural network and observed neuroimaging signals is highly surjective. In EEG and MEG this subjectivity arises from the underdetermined nature of the backward solution. Therefore, a crucial step towards the outlined goals is the correct synchronization of model and data, that is, the alignment of model states with internal—but often unobservable—states of the system. Hence strategies for synchronizing brain models with experimental neuroimaging data are required.

In the framework of the model, a biologically realistic large scale coupling of neural populations is provided at salient brain regions that is mediated by long-range neural fibre tracts as identified with diffusion tensor imaging (DTI) based tractography together with mean-field models that are able to reproduce typical features of mesoscopic population dynamics such as the reduced forms of the Hindmarsh-Rose and the FitzHugh-Nagumo models.

The Stefanescu-Jirsa reduced Hindmarch-Rose neural network model provides a low dimensional description of complex neural population dynamics including synchronization, multiclustered solutions in phase space, and oscillator death. The conditions under which this behaviour occurs are shaped by specific parameter settings, including connectivity strengths and neuronal membrane excitability.

Each network node is governed by its own intrinsic dynamics superimposed with the dynamics of all other network nodes that are each connected via specific connection weights and time delays yielding the following evolution equation for the time course t=1, ..., T of the network mean-field potential $\{x_i(t)\}$ at node i:

$$x_i(t+1) = x_i(t) + f(x_i(t))dt + c\sum_{j=1}^{N} w_{ij}x_j(t-\Delta t_{ij}) + \eta(t). \quad \text{Eq. 1}$$

The equation describes the numerical integration of a network of N connected neural populations i=1...N. The large-scale network is described by connection weights $w_{ij}$ where index j indicates the weight of node j exerting an influence on the node indexed by i. The time delays for information transmission $\Delta t_{ij}=d_{ij}/v$ depend on a distance matrix $d_{ij}$ and a constant conduction speed v. Weights are scaled by a constant c. Additive noise is introduced by the term $\eta(t)$.

For each node, a neural population model $f(x_i(t))=\dot{x}_i(t)$ describes the local dynamic at each of the nodes of the large-scale network. The six coupled first-order differential equations are a reduced representation of the mean-field dynamics of populations of fully connected neurons that are clustered into excitatory and inhibitory pools. Since the reduced system is described by three modes each variable and parameter is either a column vector with 3 rows or a 3×3 square matrix:

$$\dot{x} = y - p_1 x^3 + p_2 x^2 - z + K_{11}(Ax-x) - K_{21}(Bw-x) + IE_i \quad \text{Eq. 2}$$
$$\dot{y} = p_3 - p_4 x^2 - y$$
$$\dot{z} = p_5 p_6 x - p_5 z - p_7$$
$$\dot{w} = v - p_8 w^3 + p_9 w^2 - u + K_{12}(Cx-x) + II_i$$
$$\dot{v} = p_{10} - p_{11} w^2 - v$$
$$\dot{u} = p_5 p_6 w - p_5 z - p_{12}$$

This dynamical system describes the state evolution of two coupled populations of excitatory (variables x, y and z) and inhibitory neurons (variables w, v and u). In its original single neuron formulation—that is known for its good reproduction of burst and spike activity and other empirically observed patterns—the variable x(t) encodes neuron membrane potential at time t, while y(t) and z(t) account for the transport of ions across the membrane through ion channels. The spiking variable y(t) accounts for the flux of sodium and potassium through fast channels, while z(t), called bursting variable, accounts for the inward current through slow ion channels (Hindmarsh and Rose 1984, incorporated herein by reference).

Parameters of the mean-field model are fitted with short epochs of simultaneously acquired EEG-fMRI data recorded from subjects. The coupling of the large-scale network is constrained by individual DTI tractography data combined with directionality data from the CoCoMac database http://cocomac.org. We aim for parameter adaptation strategies that efficiently enable the brain model to reproduce the recorded EEG-fMRI timeseries with the long-term target to analyse resulting parameter dynamics for biological relevance.

EEG waveforms recorded on the scalp are due to a linear superposition of micro-current sources. However, the mechanisms of source interaction from which dynamic signals emerge remain mostly unknown. It has been shown that time delays of signal transmission between large-scale brain regions that emerge from the specific underlying large-scale connectivity structure due to finite transmission speeds can have a profound impact on the dynamic properties of the system.

Ghosh and colleagues demonstrate that in large-scale models, besides realistic long-range connectivity, the addition of noise and time delays enables the emergence of fast neuroelectric rhythms in the 1-100 Hz range and slow hemodynamic oscillations in the ultraslow regimes <0.1 Hz. Hence the model, includes the connectivity structure derived from tractography results and investigate the effects of variation in coupling on emerging brain dynamics by comparing modelling results across different subjects.

Forward Model

Neural source activity time courses are projected into EEG respectively BOLD (blood oxygen level dependent contrast) space using a forward model. In the following, we will briefly outline simulation pipelines for the forward estimation of BOLD and EEG signals and the backward estimation of source time courses.

Forward Model 1: Computing the EEG Signal

Three compartment volume conductor models are constructed from structural MRI data; surfaces for the interfaces between grey matter, cerebrospinal fluid and white matter are approximated with triangular meshes. For EEG predictions, volume conduction models for skull and scalp surfaces are incorporated. Here we assume that electric source activity can be well approximated by the fluctuation of equivalent current dipoles generated by excitatory neurons that have dendritic trees oriented roughly perpendicular to the cortical surface and that constitute the majority of neuronal cells (~85% of all neurons). We neglect dipole contributions from inhibitory neurons since they are only present in a low number (~15%) and their dendrites fan out spherically. Therefore, dipole strength can be assumed to be roughly proportional to the average membrane potential of the excitatory population.

Besides amplitude, every dipole has six additional degrees of freedom necessary for describing its position and orientation within the cortical tissue. Dipole locations are assumed to be identical to source locations (ROIs) used for DTI-tractography, while orientations are inferred from segmented anatomical MRI resting on the assumption that cortical dendrites are perpendicular to gyri surfaces.

Under these assumptions, the transfer matrix A can be calculated using, e.g., a boundary element method, yielding a transformation from source dipole activity $D_j(t)$ at a triangle corner vertex j to the potential $\varphi_i(t)$ of electrode i at time t:

$$\varphi_i(t)=[AD]_i=\Sigma_j a_{ij} D_j(t).$$

BEM models are based on meshes that form a closed triangulation of the compartment surfaces from segmented T1-weighted MRI surfaces. Finite Element Method models consist of multiple tetrahedra allowing to model tissue anisotropy that is physiologically more realistic at the cost of computational resources.

Forward Model 2: Computing fMRI BOLD Contrast

Subsequent to the fitting of electric activity with the model, we want to compare model predictions of BOLD contrast with actual recorded fMRI time-series data in order to deduce and integrate further constrains from and into the model and to perform analyses on the coupling between neural activity and BOLD contrast fluctuation.

The BOLD signal time course is approximated from the mean-field time-course of excitatory populations accounting for the assumption that BOLD contrast is primarily modulated by glutamate release. Apart from these assumptions, there is relatively little consensus about how exactly the neurovascular coupling is realized and whether there is a general answer to this problem.

Up to now, we approximated neurovascular coupling with a hemodynamic response function that is convoluted with the excitatory mean-field potential in order to obtain BOLD time courses. We may include to more sophisticated accounts like the "Balloon-Windkessel" model of (Friston, Harrison et al. 2003) for some more technical details.

Backward Solution: Source Imaging and Equivalent Current Dipoles

As a first step towards the integration of recorded EEG time-series with mean-field population models, the time courses of cortical sources are estimated from recorded data using neural source imaging methods.

The forward problem of EEG has a unique solution. Conversely, the inverse problem of EEG, i.e., the estimation of a tomography of neural sources from EEG channel data, is an ill-conditioned problem lacking a unique solution. EEG constitutes a convolved signal from multiple, simultaneously active and regionally overlapping neural sources that are spatially mixed and summed across the brain by volume conduction. Due to the underdetermined nature of the inverse problem it may yield multiple solutions that equivalently reproduce the observations.

We address this ill-posedness by the introduction of aforementioned constraints, namely: realistic, subject specific head models segmented from anatomical MRI images, physiological priors and source space based regularization schemes and constraints.

A commonly used prior is to restrict neural sources using the popular equivalent current dipole model reducing the backward problem to the estimation of one or a few dipole locations and orientations. This approach is straightforward and fairly realistic since the basis of our modelling approach rests on the assumption that significant parts of a recorded EEG time-series are generated by the interaction of our large-scale model sources. Consequently, we can incorporate the location and orientation information of these sources as priors, thereby alleviating the ill-posedness of the backward solution for this special modelling scenario.

More general source imaging approaches that attempt to estimate source activity over every point of cortex rest on more realistic assumptions but need further constraining in order to be computationally tractable, i.e., the degrees of freedom need to be reduced by applying a regularization scheme that yields likely regions for cortical activation. Nevertheless, current density field maps are not necessarily "closer to reality" than dipole source models, since the spatial spread is due to imprecision in the source estimation method rather than a direct reconstruction of the potential field of the actual.

In order to estimate the source waveforms for a given recorded EEG time-series a current equivalent dipole approach can be based on the inversion of the lead-field matrix. Source space projection in order to derive source time-courses can be done with commonly used software packages (e.g., the open-source Matlab toolbox FieldTrip or BrainStorm or the commercial product Brain Voyager or Besa) by computing the inverse of the lead-field matrix on the basis of the given source dipole positions and orientations and the volume conductor-model that can all be derived from anatomical MRI data of the subjects. Furthermore, priors derived from BOLD contrast fluctuation can be exploited to alleviate source imaging.

Data-Model Integration

Synchronizing computational models that are able to reproduce typical dynamical features of brain activity with actual recorded neuroimaging data requires several methodological considerations.

For models that describe broad-band neuronal population activity comprising spiking and slow oscillations—as the reduced Hindmarsh-Rose model—it is reasonable to fit simulated outputs with EEG and BOLD signals simultaneously since different aspects of neuronal activity are captured by the imaging modalities.

We do not attempt to fuse the mean-field output of the model with recorded EEG in signal space but rather in source space by applying a source reconstruction scheme to the EEG data. The simultaneously acquired fMRI signal is compared to the mean-field amplitude fluctuation that was convolved with a hemodynamic response function. The reason for this is simple and straightforward. Assuming an equivalent current dipole model, the integration of model and data in channel space requires a forward model that in turn requires an accurate representation of source distribution in terms of location and orientation. Dipole locations are known since source locations are known, they are obtained by DTI tractography. Anatomical priors for dipole orientation are derived from the cortical folding pattern of anatomical MRI data. Dipole orientations are assumed to remain fixed and normal to the cortical folding pattern.

A further advantage of source space integration arises from the fact that we intend to fit short snippets of model output with a long (20 minutes) time series of recorded data in order to obtain relevant parameter settings for reproducing the ongoing fluctuation of brain activity. Source time-course reconstruction enables us to initialize model variables with actual cortical source time-courses and to compare model outputs for different parameter settings with the actual continuation of the source time-series.

This allows for efficient recalibration of model parameters. Instead of computing a time-consuming forward solution for every model output subsequent to each parameter variation, we only have to calculate a source reconstruction once and are then able to effectively compare it to model output in the light of parameter variations. This approach integrates into the overall concept of generating a "model library" that maps specific parameter settings to dynamic model output (in terms of a succession of relevant signal features, for example, brain dynamics characterized by a trajectory of the relative power of frequency bands in each source node).

The backward estimation of source potential time courses is valid since only assumptions and parameter constraints that were already implemented in the forward part of the model are used. Therefore, weaknesses in the backward estimate directly relate to model weaknesses or posed differently: the backward estimate as accurate as the model.

Furthermore, it is highly unlikely that the neural population activity we consider in our model is exactly congruent with the actual sources generating the recorded EEG signal. Therefore, we (i) restrict our model to the reconstruction of source activity time-series obtained by backward inference and (ii) try to improve the ill-posed backward estimate by deriving methods that maximize the fit between source and image dynamics in an iterative backward-forward estimation manner.

Parameter values are systematically inferred using an estimation strategy that is guided by several different principles:

Parameter ranges are constrained by biophysical and graph-theoretic priors.

In an aspect, models are not fitted with time-series using standard parameter optimization techniques, but dictionaries are created that associate specific parameter settings with resulting model dynamics. This provides a convenient way to fit the model with experimental data without the need to re-optimize parameters for every time-step. Aside from dictionaries that associate parameter settings with mean-field amplitudes of large-scale nodes, dictionaries may be built that associate typical mean-field-configurations of nodes with resulting EEG and BOLD topologies.

Unlikely parameter changes are penalized and parameters are chosen such that implausible changes are avoided. Based on bifurcation analyses, the likelihood of parameter settings is estimated in order to drive the system into a state of self-organized criticality.

A typical workflow implementing the discussed framework starts with the aforementioned initial backward estimate of underlying source activity that is in turn used as initial condition for model simulation, i.e., source timeseries are estimated and a short time snippet that we obtain from a simulation database is used as initial model source time series.

This initial estimate serves as a preliminary configuration of parameter and source time-series states. The initially short snippet is incrementally prolonged and parameters are refitted.

A Dictionary of Dynamical Regimes

Due to the high number of free parameters (number of free parameters of all six equations for the excitatory and inhibitory population times the number of sources) and the resulting high model complexity, manual parameterization of the model is, of course, infeasible.

Model Inversion approaches (e.g. Dynamic Causal Modelling, Bayesian Inversion or Bayesian Model Comparison based approaches) build on the inversion of a generative model of only a few sources (up to about ten). These approaches are intractable, in our case, due to the high number of contributing sources and the resulting combinatorial explosion of parameter combinations.

In the framework of control theory, the problem of parameter estimation in complex dynamical systems is approached by the implementation of state observers in order to provide estimates of the internal states of a system given measurements of the input and output of the system.

Recently, several state observer techniques have been developed and successfully applied to biological systems identifying parameters by incorporating the specific structure of the problem based on an expansion of the system and the transformation of parameters into or by the use of extended and unscented Kalman filtering methods.

Modern automatic parameter optimization methods like evolutionary algorithms are often able to find acceptable solutions in complex optimization problems or to fully generate the structure of brain network models based on physiological constraints. However, it is very likely that model parameters are subject to ongoing variations throughout the course of even short time series and it hence becomes necessary to re-fit parameters for every time segment.

Therefore, it is unreasonable to perform time-consuming searches through very large parameter spaces (the number of model instances is in the order of $10^{94}$ if we assume 10 possible settings for each parameter and 94 source nodes) for every short epoch of experimental data. Furthermore, it is unlikely that there is a single correct model, but many parameter combinations might yield the same result.

Instead, we build on a strategy that—under certain assumptions—allows us to explicitly calculate exact parameter values by algebraic solution, respectively least squares estimation. Exploiting several features of our modelling setup, we become able to calculate parameter values by simply solving a system of linear equations.

A considerable reduction of parameter space can be achieved by regularising model space from coupled dynamics to uncoupled dynamics by disentangling all coupled interactions, i.e., all incoming potentials from all other nodes are subtracted from each time series. This can be consistently done inside our modelling framework by inverting the forward formulation by the simple subtraction of the coupling term $$\left( c \sum_{j=1}^{N} w_{ij} x_j(t - \Delta t_{ij}) \right)$$

from Eq.1. Thereby, the forward model is reversed in a well-defined manner, since all coupling weights $w_{ij}$ and all time delays $t_{ij}$ are given by tractography and the time series $x_j(t)$ by source estimation results.

This operation and omitting the noise term yields us an approximation of the uncoupled mean-field time-series $x_i(t)$ for all source nodes i. Furthermore, all differentials $f(x_i(t))dt$ can be easily obtained by subtracting consecutive time-points.

The next step is to obtain an initial parameter and state estimate that captures the prevalent dynamic regime over a short time snippet (~1-5 seconds) of the uncoupled source time-series.

This issue can be addressed by extending the initial parameter space mapping (with a database driven approach by the construction of simulation databases. Instead of tuning parameters for every short time segment, a dictionary is created that relates specific parameter settings to resulting model dynamics.

Thus, we aim to generate a database that associates parameter and variable settings to model dynamics. This dictionary is used to decompose source time-courses into prototypic atoms of mode time-series in order to derive initial coarse model state priors for subsequent parameter estimation and refinement.

We start by laying a coarse grid over the parameter space and simulate mean-field activity for grid points, similar to the initial parameter mapping. Subsequently, the resolution of the grid can be increased according to desired accuracy or space and runtime constraints. Each resulting waveform is classified according to several criteria that discern specific dynamical regimes.

In this first estimation step, only coupling parameters $(K_{11}, K_{12}, K_{21})$ and distribution-parameters of membrane excitabilities (mean m and dispersion $\sigma$) are estimated since these are the main determinants of the resulting dynamic regime of the mean-field over both populations. Parameters that correspond to biophysical properties of the respective neuron populations $(p_1-p_{12})$ are optimized in subsequent steps. Along with initial parameter estimates, this first step also provides us with initial estimates of time course snippets of the second and third variable (y and z) and the time-courses of all three variables of the inhibitory population (w, v, u), or more specifically their corresponding mode time courses for all three modes. These initial estimates will be used for the estimation of all remaining parameter values that are left unspecified up to that point. The matrices A, B and C are given and need not to be inferred.

Analyses of model simulations under several different parameter settings and initial conditions revealed good discriminability of the dynamic properties of the three modes during uncoupled population simulations in the presence of noise. Long-term simulation runs under stable conditions show that while the third mode contains most of the fast-varying dynamics, the two other modes reveal only slowly varying dynamics and linear trends.

Mode decomposition, component analysis, factor analysis and signal separation techniques refer to the problem of representing a set of mixed signals by a linear superposition of a set of generating signals or subcomponents.

In our case, dictionary entries are classified according to prototypical dynamical model properties as inferred by model simulations in the presence of additive noise. Therefore, we classify snippets according to a variety of dynamical metrics that have relevance for cognition. We disentangle estimated source time-series into modes using a dictionary that resembles the prototypical dynamics of model modes. Thereby, the problem of uniqueness of the solution is addressed by the inclusion of appropriate priors on the dynamical properties of the respective time-series.

Therefore, we suppose our source signal to be a linear superposition (with equal weights) of atoms taken from our dynamic regime dictionary made up of short time-sequences and their respective modes. In a two-step procedure, we first estimate a set of mean-field atom snippets from the dictionary that show a high similarity to the source snippet. Then, among these snippets, we choose one snippet that resembles the constitutive components of the source signal most closely. To start with, one could employ a simple correlation based mode decomposition that estimates the correlation between the previously estimated source time courses are simply correlated with the full time-series first and the decomposed time-series later. Later, it might be reasonable to use more sophisticated signal separation techniques. Specifically, we aim for the adaptation of existing non-approximate state observer or Kalman filter approaches from control theory to our problem setting.

Refining Source Parameters

As outlined above, we first subtract long-range coupling terms from each of the estimated source time-courses using the time-delays and coupling strengths specified in the large-scale model in order to reconstruct uncoupled source dynamics. Then, we convolve the uncoupled source time-courses with entries in the "dynamic regime dictionary" yielding one mean-field waveform that fits the short-term dynamics of source estimates best. Thereby, we obtain a coarse estimate of coupling parameters and prototypical time-series for each mode of the excitatory and inhibitory populations as well as parameter and variable estimates of the second and third differential equations of both populations. This time-course snippet resembles prototypical model behaviour, i.e., typical trajectories in the state space of the model resulting from random initial conditions and simulations in the presence of noise. Several features of the simulated dynamics of the model are similar to the dynamics observed in neuroimaging signals. However, noisy conditions are, as mentioned earlier, critical for the model to explore different dynamical regimes. In simulations without noise, model variables are attracted to steady state within a few thousand time-steps. In this part of the reconstruction scheme, we are interested in expressing the observed dynamical regime as the result of parameter fluctuations, instead of additive noise. Therefore, we now estimate parameter trajectories that, when inserted in the model, reconstruct the observed variable trajectories. We assume that parameter settings stay fixed for at least a short period of time, i.e., ten to one hundred time-steps, respectively several picoseconds.

This assumption allows us to estimate parameter values by constructing for each of the six dynamic equations and their respective modes, a system of linear equations by reversing parameters and variables, with parameters being then variables and vice versa using the time-course variables over several consecutive time-steps. After lumping all approximated parameter and source value estimates of the six equations together into six terms $c_1$-$c_6$ and exchanging model variables (x,y,z) with the estimated initial values (referred to as $k_1$-$k_4$) the dynamic equations 1-3 from (Eq. 2) yield:

$$c_1 = p_1 k_1 + p_2 k_2$$

$$c_2 = p_3 - p_4 k_2$$

$$c_3 = p_5 p_6 k_3 - p_5 k_4 - p_7$$

and analogous for equations 4-6 and values (u,v,w). Note that for the construction of this system of equations we assume the coupling parameters ($K_{11}$, $K_{12}$, $K_{21}$) to be fixed and given from the "dynamic regime dictionary"; nevertheless, it would also be possible to solve the system with those parameters being unassigned. Since the first equation is a linear equation containing only two unknowns, it can be solved using the values from two consecutive time-steps.

Sweeping this estimation procedure over the whole snippet yields parameter trajectories for the whole time-series and allows us to express recorded neuroimaging time-series as parameter fluctuations of a computational brain model.

Parameter-Space Analyses

Following the reconstruction of model dynamics from time-series, i.e., the expression of time-series in terms of model behaviour, several neurobiological questions can be addressed. State and parameter space trajectories can be related to experimental conditions and brain dynamics to cognition. Model dynamics are matched with observed behaviour and model dynamics in turn relate to biophysical properties of the system. Therefore, our approach allows us to directly associate low-level neuronal dynamics with top-level processes and to identify metrics that quantify the functional relevance of dynamical features for cognition and behaviour under normal and pathological conditions. Parameter and state space dynamics can be analysed with regard to biophysical relevance, e.g., parameter dynamics may be associated with biological phenomena; parameter dynamics may be associated with behaviour or pathological conditions; macroscopic, mesoscopic or microscopic connectivity impact on resulting model dynamics may be measured; potential relationships between the slow-varying dynamics of the first and second modes of the model and the localized hemodynamic responses at the respective fitting site of the electrodynamic source may be evaluated; and, BOLD information may be integrated into the model. Using a deconvolution model, the behaviour of slowly varying dynamics in the model may be directly associated with BOLD contrast dynamics.

The invention claimed is:

1. A non-transitory computer readable medium encoded with non-transitory computer readable instructions for performing a process comprising:
   accessing a computer-stored computer-simulation human whole brain model representing whole brain neural activity, the whole brain model divided into a plurality of user-modifiable anatomical regional brain subunit models respectively representing regional brain subunit neural activity and including a neural connectivity structure of the regional brain subunit within the regional brain subunit, to one or more other regional brain subunits of the whole brain model, or both; and
   receiving user-modification of the human whole brain model or at least one of the regional brain subunit models to customize to a particular patient based at least in part on fitting at least one parameter of the human whole brain model or at least one of the regional brain subunit models to empirical intrinsic neural activity data measured from the particular patient.

2. The non-transitory computer readable medium of claim 1, wherein the process further comprises:
   performing a computer simulation using at least one of a plurality of stored models of at least one of the whole brain or at least one regional brain subunit, each model comprising a plurality of nodes, wherein one or more parameters of at least one of the whole brain model or at least one of the regional brain subunit models are identified using the computer simulation using the at least one of a plurality of models.

3. The non-transitory computer readable medium of claim 2, wherein the process further comprises:
   searching the plurality of models to identify one or more of the models that correspond to a user-indicated property in response to a received user-directed search request; and
   fitting at least one parameter of the whole brain model or of at least one of the plurality of nodes of the identified one or more of the models that correspond to the user-indicated property.

4. The non-transitory computer readable medium of claim 3, wherein the user-indicated property indicated in the received user-directed search request comprises at least one of an alpha-rhythm, a prototypical rhythm, or other behavioral functional property of brain dynamics.

5. The non-transitory computer readable medium of claim 2, wherein one or more of the plurality of nodes represent a local subunit of the regional brain subunit, wherein a simulation model resolution defined by a number of local subunits represented by the one or more of the plurality of nodes corresponds to a spatial resolution of a neuroimaging modality.

6. The non-transitory computer readable medium of claim 2, wherein the process includes generating, for display on a graphical user interface, a visual presentation based on the computer simulation, wherein the graphical user interface is presented on a web interface.

7. The non-transitory computer readable medium of claim 1, wherein at least one of the whole brain model or at least one of the regional brain subunit models includes one or more of:
information about one or more methods applied during pre-processing of data used to generate at least part of the whole brain model;
a length of a neurodataset;
a labelling of different neurodatasets according to their occurrence; or
a condition of a subject from which a neurodataset was obtained.

8. The non-transitory computer readable medium of claim 1, wherein the process further comprises:
receiving a current instance of a user-directed search request;
receiving a plurality of previous user-directed search requests previously received prior to receiving the current instance of the user-directed search request;
determining that one or more parameters of the accessed whole brain model identified as being associated with a user-indicated property of a neurodataset indicated in the user-directed search request was also identified in response to receiving the plurality of previous user-directed search requests; and
adding the user-indicated property indicated in the current instance of the user-directed search request to a dataset corresponding to the one or more parameters in response to the determining.

9. The non-transitory computer readable medium of claim 8, wherein the plurality of previous user-directed search requests were for the user-indicated property of the neurodataset indicated in the current instance of the user-directed search request.

10. The non-transitory computer readable medium of claim 8, wherein the process further comprises ranking a plurality of datasets including the dataset based on a number of datasets identified in the plurality of previous user-directed search requests that were previously received.

11. A computer-assisted method comprising:
accessing a computer-stored computer-simulation human whole brain model representing whole brain neural activity, the whole brain model divided into a plurality of user-modifiable anatomical regional brain subunit models, each regional brain subunit model representing regional brain subunit neural activity and including a connectivity structure of a regional brain subunit, the connectivity structure including connectivity information of the regional brain subunit within the regional brain subunit and to one or more other regional brain subunits of the whole brain model; and
receiving user-modification of the human whole brain model or at least one of the regional brain subunit models to customize to a particular patient based at least in part on fitting at least one parameter of the human whole brain model or at least one of the regional brain subunit models to empirical intrinsic neural activity data measured from the particular patient.

12. The method of claim 11 further comprising:
storing a plurality of models of at least one of the whole brain or at least one regional brain subunit, each model comprising a plurality of nodes, wherein the fitted at least one parameter is identified using the plurality of models.

13. The method of claim 12 further comprising:
searching the plurality of models to identify one or more of the models that correspond to a user-indicated property in a received user-directed search request; and
fitting at least one parameter of at least one of the plurality of nodes of the identified one or more models.

14. The method of claim 13, wherein the user-indicated property indicated in the received user-directed search request comprises at least one of a behavioral property, an alpha-rhythm, or prototypical rhythm.

15. The method of claim 12, wherein one or more of the plurality of nodes represent a local subunit of the regional brain subunit, wherein a simulation model resolution defined by a number of local subunits represented by the one or more of the plurality of nodes corresponds to a spatial resolution of a neuroimaging modality.

16. The method of claim 11, wherein the method includes:
performing a computer simulation using the a computer-stored computer-simulation primate whole brain model;
generating, for display on a graphical user interface, a visual presentation based on the computer simulation, wherein the graphical user interface is presented on a web interface.

17. The method of claim 11, wherein at least one of the whole brain model or at least one of the regional brain subunit models includes one or more of information about one or more methods applied during pre-processing of data used to generate at least part of the whole brain model, a length of a neurodataset, a labelling of different neurodatasets according to their occurrence, and a condition of a subject from which a neurodataset was obtained.

18. The method of claim 11 further comprising:
receiving a plurality of previous user-directed search requests previously received prior to receiving a current instance of the user-directed search request;
determining that the one or more parameters of the accessed whole brain model that was identified as being associated with a user-indicated property of a neurodataset indicated in a user-directed search request was also identified in response to receiving the plurality of previous user-directed search requests; and
adding the user-indicated property indicated in the current instance of the user-directed search request to a dataset corresponding to the one or more parameters in response to the determining.

19. The method of claim 18, wherein the plurality of previous user-directed search requests were for the user-indicated property of the neurodataset indicated in the current instance of the user-directed search request.

20. The method of claim 18, wherein the method further comprises ranking a plurality of datasets including the dataset based on a number of datasets identified in the plurality of previous user-directed search requests that were previously received.

21. A non-transitory computer readable medium encoded with non-transitory computer readable instructions for performing a process comprising:
accessing a stored computer-simulation human whole brain model representing whole brain neural activity, the whole brain model divided into a number of user-modifiable anatomical regional brain subunit models respectively representing regional brain subunit neural activity and including a neural connectivity structure of the regional brain subunit within the regional brain subunit, to one or more other regional brain subunits of the whole brain model, or both;

receiving user-modification of the human whole brain model or at least one of the regional brain subunit models to customize to a particular patient based at least in part on fitting at least one parameter of the human whole brain model or at least one of the regional brain subunit models to empirical intrinsic neural activity data measured from the particular patient; and wherein the stored computer-simulation primate whole brain model includes a plurality of nodes and wherein:

the number of user-modifiable anatomical regional brain subunits corresponding to a spatial resolution of a specified neuroimaging modality;

at least one of a forward or inverse transformation model to map an output of the model to a space corresponding to a neurodataset or to a source space corresponding to the plurality of nodes of the stored computer-simulation primate whole brain model.

22. The non-transitory computer readable medium encoded with non-transitory computer readable instructions for performing the process of claim 21, and wherein:

the stored computer-simulation primate whole brain model is generated using at least two different neuroimaging data modalities including at least two of: MRI images, DTI images, fMRI images, EEG signals.

23. The non-transitory computer readable medium encoded with non-transitory computer readable instructions for performing the process of claim 22, and wherein the at least two different neuroimaging data modalities includes co-registering the at least two different neuroimaging data modalities.

* * * * *